(12) United States Patent
Wang (10) Patent No.: US 10,862,571 B2
(45) Date of Patent: Dec. 8, 2020

(54) MOBILE TERMINAL AND ANTENNA CONNECTION METHOD

(71) Applicant: VIVO MOBILE COMMUNICATION CO., LTD., Chang'an Dongguan (CN)

(72) Inventor: Feng Wang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/499,121

(22) PCT Filed: Mar. 30, 2018

(86) PCT No.: PCT/CN2018/081342
§ 371 (c)(1),
(2) Date: Sep. 27, 2019

(87) PCT Pub. No.: WO2018/177413
PCT Pub. Date: Oct. 4, 2018

(65) Prior Publication Data
US 2020/0044727 A1 Feb. 6, 2020

(30) Foreign Application Priority Data
Mar. 31, 2017 (CN) .......................... 2017 1 0209664

(51) Int. Cl.
*H04B 1/06* (2006.01)
*H04W 88/06* (2009.01)
(Continued)

(52) U.S. Cl.
CPC ......... *H04B 7/0871* (2013.01); *H04B 1/3833* (2013.01); *H04W 88/06* (2013.01); *H01Q 1/243* (2013.01)

(58) Field of Classification Search
CPC .. H04B 7/0871; H04B 1/3833; H04B 7/0805; H04B 7/0608; H04B 7/0404;
(Continued)

(56) References Cited

U.S. PATENT DOCUMENTS

2006/0025171 A1 2/2006 Ly et al.
2007/0200773 A1* 8/2007 Dou .................. H01Q 21/28
343/702

(Continued)

FOREIGN PATENT DOCUMENTS

| CN | 106130618 A | 11/2016 |
|---|---|---|
| CN | 106374969 A | 2/2017 |
| CN | 106953675 A | 7/2017 |

OTHER PUBLICATIONS

European Search Report in Application No. 18775478.3 dated Mar. 11, 2020.
(Continued)

Primary Examiner — Andrew Wendell
(74) Attorney, Agent, or Firm — Maschoff Brennan (57) ABSTRACT

Provided in an embodiment of the present disclosure are a mobile terminal and an antenna connection method. The mobile terminal includes a controllable switch, a network path, and an antenna. One end of the controllable switch is connected to the antenna, and the other end of the controllable switch is connected to the network path. The controllable switch is configured to control a connection between the network path and the antenna. The antenna is configured to receive and transmit signals, and includes a first antenna and a second antenna, and a radiation performance of the first antenna is higher than a radiation performance of the second antenna. The network path is configured to provide a network service for the mobile terminal, and includes a first network path and a second network path.

8 Claims, 4 Drawing Sheets

(51) Int. Cl.
*H04B 7/08* (2006.01)
*H04B 1/3827* (2015.01)
*H01Q 1/24* (2006.01)

(58) Field of Classification Search
CPC .. H04B 7/0814; H04B 7/0602; H04B 1/0064; H04B 1/005; H04B 17/318; H04W 88/06; H04W 40/02; H01Q 1/243
See application file for complete search history.

(56) References Cited

U.S. PATENT DOCUMENTS

| | | | |
|---|---|---|---|
| 2008/0165073 A1* | 7/2008 | Chou | H01O 9/30 343/793 |
| 2008/0273579 A1* | 11/2008 | Rofougaran | H01Q 1/246 375/219 |
| 2010/0090777 A1* | 4/2010 | Song | H01Q 21/28 333/101 |
| 2011/0105026 A1* | 5/2011 | Hsiao | H04B 1/48 455/41.2 |
| 2012/0315851 A1 | 12/2012 | Park et al. | |
| 2013/0064151 A1* | 3/2013 | Mujtaba | H04B 7/0871 370/311 |
| 2013/0157586 A1 | 6/2013 | Saito et al. | |
| 2013/0162495 A1* | 6/2013 | Kwon | H01Q 21/28 343/852 |
| 2015/0188599 A1* | 7/2015 | Shi | H04L 1/18 455/78 |
| 2016/0277079 A1 | 9/2016 | Fikar et al. | |
| 2016/0380665 A1* | 12/2016 | Lee | H04B 1/18 455/552.1 |
| 2017/0373368 A1* | 12/2017 | Srirattana | H01P 5/18 |
| 2018/0277963 A1* | 9/2018 | Desclos | H01Q 21/20 |
| 2020/0044727 A1 | 2/2020 | Wang | |

OTHER PUBLICATIONS

CN Office Action in Application No. 201710209664.2 dated Oct. 8, 2019.
Written Opinion and International Search Report in Application No. PCT/CN2018/081342 dated Oct. 10, 2019.

* cited by examiner

MOBILE TERMINAL AND ANTENNA CONNECTION METHOD

CROSS-REFERENCE TO RELATED APPLICATION

The present application is the U.S. national phase of PCT Application No. PCT/CN2018/081342 filed on Mar. 30, 2018, which claims a priority of the Chinese patent application No. 201710209664.2 filed in China on Mar. 31, 2017, which is incorporated herein by reference in its entirety.

TECHNICAL FIELD

The present disclosure relates to the field of communication technology, in particular to an antenna connection method, and a mobile terminal.

BACKGROUND

Along with the rapid development of the communication technology, especially along with the popularization of mobile Internet, such mobile terminals as smart phones and tablet computers have become more and more popular as an important communication tool in our lives.

Usually, these mobile terminals are each equipped with an antenna, so as to access to a network via the antenna. To be specific, the antennae on the mobile terminal may include a $2^{nd}$-Generation (2G)/$3^{rd}$-Generation (3G)/$4^{th}$-Generation (4G) primary antenna, a 4G diversity antenna, a Wireless Fidelity (WiFi) antenna, a Global Positioning System (GPS) antenna, etc.

Generally, the WiFi antenna and the 4G diversity antenna are both located at the top of the mobile terminal, while the 2G/3G/4G primary antenna is located at the bottom of the mobile terminal. However, due to the limit of a design of the mobile device, e.g., when a front camera and a rear camera are arranged at different positions at the top of the mobile terminal, an antenna environment of the mobile device may be greatly affected. For example, when the camera is located in proximity to the WiFi antenna, a WiFi antenna environment may be deteriorated, and thereby a radiation performance of the WiFi antenna may be worse than a radiation performance of the 4G diversity antenna.

SUMMARY

An object of the present disclosure is to provide an antenna connection method and a corresponding mobile terminal, so as to solve the problem that the radiation performance of the antenna is deteriorated due to the deteriorated antenna environment in the mobile terminal.

In one aspect, the present disclosure provides in some embodiments a mobile terminal, including a controllable switch, a network path, and an antenna. One end of the controllable switch is connected to the antenna, and the other end of the controllable switch is connected to the network path; the controllable switch is configured to control a connection between the network path and the antenna; the antenna is configured to receive and transmit signals, and includes a first antenna and a second antenna, wherein a radiation performance of the first antenna is higher than a radiation performance of the second antenna; the network path is configured to provide a network service for the mobile terminal, and includes a first network path and a second network path. When the controllable switch is in a first connection state, the first network path is electrically connected to the first antenna, and the network service is provided by the first network path. When the controllable switch is in a second connection state, the second network path is electrically connected to the first antenna, and the network service is provided by the second network path.

In another aspect, the present disclosure provides in some embodiments an antenna connection method for the above-mentioned mobile terminal, including: detecting the network service currently adopted by the mobile terminal, and determining a current network path, wherein the current network path includes the first network path and the second network path; determining a target connection state of the controllable switch in accordance with the current network path; and switching the controllable switch to be in the target connection state, to enable the current network path to be electrically connected to the first antenna via the controllable switch. The determining the target connection state of the controllable switch in accordance with the current network path includes: when the current network path is the first network path, selecting a predetermined first connection state corresponding to the first network path as the target connection state; and when the current network path is the second network path, selecting a predetermined second connection state corresponding to the second network path as the target connection state.

In yet another aspect, the present disclosure provides in some embodiments a computer-readable storage medium storing therein a computer program. The computer program is executed by a processor so as to implement the above-mentioned antenna connection method.

The embodiments of the present disclosure have following advantages. According to the embodiments of the present disclosure, through the additional controllable switch between the antenna and the network path, the network path connected to the antenna in the mobile terminal may be switched and configured flexibly in such a manner that the mobile terminal acquires the currently-adopted network service via the first antenna having a high radiation performance. As a result, it is able to prevent the mobile terminal from acquiring the currently-adopted network service via the second antenna having a low radiation performance, thereby to improve the user experience.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

In the following, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

It should be appreciated that, the scheme in the embodiments of the present disclosure may be applied to various mobile terminals, e.g., mobile phone, tablet computer, on-board computer, or handheld smart device, which will not be particularly defined herein.

Figure 1A:
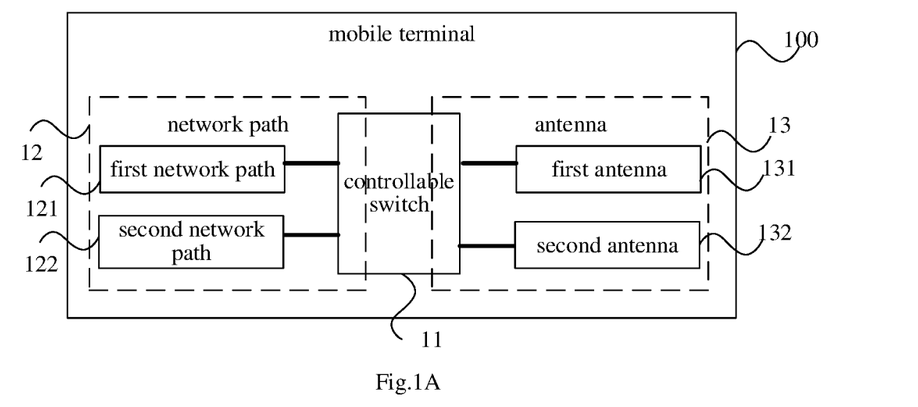
FIG. 1A is a block diagram of a mobile terminal according to an embodiment of the present disclosure.

FIG. 1A is a block diagram of a mobile terminal according to an embodiment of the present disclosure.

In the embodiments of the present disclosure, a mobile terminal 100 includes a controllable switch 11, a network path 12 and an antenna 13. One end of the controllable switch 11 is connected to the antenna 13, and the other end of the controllable switch 11 is connected to the network path 12. The controllable switch 11 is configured to control a connection between the network path 12 and the antenna 13. The antenna 13 is configured to receive and transmit signals, and includes a first antenna 131 and a second antenna 132, wherein a radiation performance of the first antenna 131 is higher than a radiation performance of the second antenna 132. The network path 12 is configured to provide a network service for the mobile terminal, and includes a first network path 121 and a second network path 122. When the controllable switch 11 is in a first connection state, the first network path 121 is electrically connected to the first antenna 131, and the network service is provided by the first network path 121. When the controllable switch is in a second connection state, the second network path 122 is electrically connected to the first antenna 131, and the network service is provided by the second network path 122.

According to the embodiments of the present disclosure, the additional controllable switch may be arranged between the antenna and the network path, i.e., the network path may be connected to the antenna through the controllable switch, so that the mobile terminal may be connected to a network and acquire a corresponding network service via the antenna.

Figure 1B:
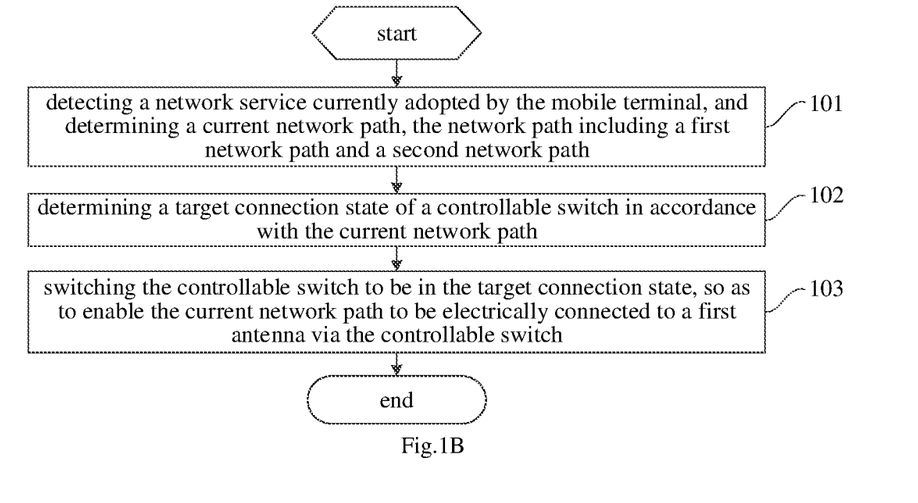
FIG. 1B is a flow chart of an antenna connection method according to an embodiment of the present disclosure.

FIG. 1B is a flow chart of an antenna connection method according to an embodiment of the present disclosure. The antenna connection method may include the following steps.

Step 101: detecting a network service currently adopted by a mobile terminal, and determining a current network path, the network path including a first network path and a second network path.

During the implementation, the mobile terminal may acquire a network including, but not limited to, at least one of a mobile communication network service and a wireless local area network service. The mobile communication network service may include network services provided via a mobile communication network, e.g., a 4G network service or a 3G network service. The wireless local area network service may include network services provided via a wireless local area network, e.g., a Wireless Fidelity (WiFi) network service. The network path in the mobile terminal may include the first network path and the second network path. The first network path, e.g., a 4G diversity path in the mobile terminal, is configured to acquire the mobile communication network service. The second network path, e.g., a 2.4G WiFi path, is configured to acquire the wireless local area network service.

In the embodiments of the present disclosure, the network service currently adopted by the mobile terminal may be detected so as to determine the current network path. The current network path may be used to represent a network path that the mobile terminal currently needs to connect to. For example, when the mobile terminal is connected to a WiFi network, a 2.4G WiFi path in the mobile terminal may be selected as the current network path, and the 2.4G WiFi path may be configured to acquire a wireless WiFi network service. When there is currently no WiFi network available for the mobile terminal and the mobile terminal is capable of connecting to a 4G network, a 4G diversity path may be selected as the network path, and the 4G diversity path is configured to acquire a 4G network service.

Step 102: determining a target connection state of a controllable switch in accordance with the current network path.

In the embodiments of the present disclosure, the mobile terminal may control, through the controllable switch, an antenna of the mobile terminal to be connected to different network paths. To be specific, when the controllable switch is in different connection states, a first antenna and/or a second antenna of the mobile terminal may be connected to different network paths. In a possible embodiment of the present disclosure, the determining the target connection state of the controllable switch in accordance with the current network path may include: when the current network path is the first network path, selecting a predetermined first connection state corresponding to the first network path as the target connection state; and when the current network path is the second network path, selecting a predetermined second connection state corresponding to the second network path as the target connection state.

In a possible embodiment of the present disclosure, the controllable switch may be a Double Pole Double Throw (DPDT) switch. Through the DPDT switch, the 2.4G WiFi path and the 4G diversity path of the mobile terminal may be selectively connected to the antenna of the mobile terminal. The controllable switch may be in either of the following two connection states.

Figure 1C:
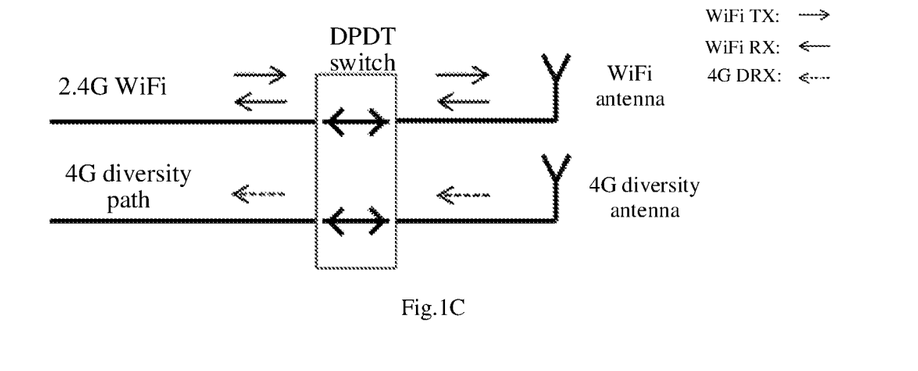
FIG. 1C is a schematic view showing a controllable switch of the mobile terminal in a first connection state according to an embodiment of the present disclosure.

State 1: the DPDT switch may be in the first connection state in which the 2.4G WiFi path is electrically connected to a WiFi antenna and the 4G diversity path is electrically connected to a 4G diversity antenna, corresponding to a state in which the 4G network service is adopted by the user, as shown in FIG. 1C. In other words, the network service currently adopted by the mobile terminal may be the 4G network service, and a corresponding network path may be the 4G diversity path.

Figure 1D:
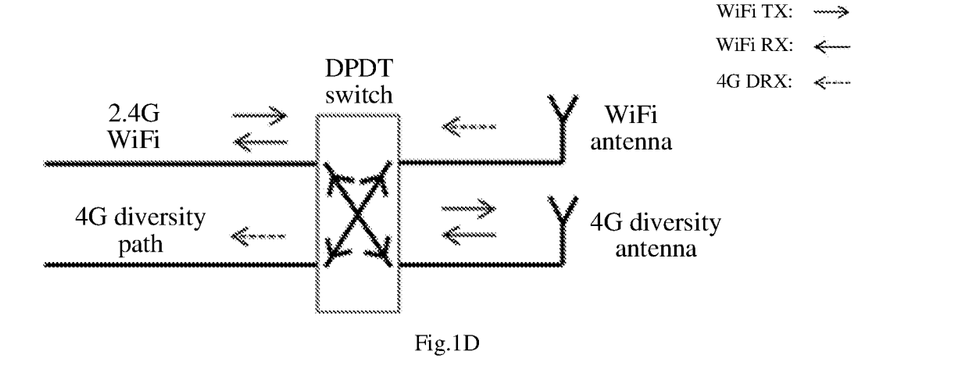
FIG. 1D is a schematic view showing the controllable switch of the mobile terminal in a second connection state according to an embodiment of the present disclosure.

State 2: the DPDT switch may be in the second connection state in which the 2.4G WiFi path is electrically connected to the 4G diversity antenna and the 4G diversity path is electrically connected to the WiFi antenna, corresponding to a state in which the WiFi network service is adopted by the user, as shown in FIG. 1D. In other words, the WiFi network rather than the 4G mobile communication network may be currently adopted by the mobile terminal, e.g., a mobile phone, to acquire a data service.

In FIGS. 1C and 1D, WIFI TX represents data transported (TX) via the 2.4G WiFi path, WIFI RX represents data received (RX) via the 2.4G WiFi path, and 4G DRX represents data diversity-received (DRX) via the 4G diversity path.

In the embodiments of the present disclosure, the target connection state where the controllable switch between the antenna and the network path is required to be may be determined in accordance with the network path corresponding to the network service currently adopted by the mobile terminal. To be specific, when the network path corresponding to the currently-adopted network service is the 4G diversity path, the first connection state may be determined as the target connection state of the controllable switch, and when the network path corresponding to the currently-adopted network service is the 2.4G WiFi path, the second connection state may be determined as the target connection state of the controllable switch.

Step 103: switching the controllable switch to be in the target connection state, so as to enable the current network path to be connected to the first antenna via the controllable switch.

In the mobile terminal of the embodiments of the present disclosure, the radiation performance of the first antenna may be higher than that of the second antenna. For example, the first antenna may be a diversity antenna, and the second antenna may be a WiFi antenna. Due to limitation of a mobile terminal Identity (ID), an environment of the WiFi antenna may be worse than an environment of the diversity antenna.

When the network path currently connected to the first antenna of the mobile terminal is not the current network path, the controllable switch may be switched to be in the target connection state by the mobile terminal. At this time, the current network path may be switched to be connected to the first antenna through the controllable switch, and the mobile terminal may acquire the currently-adopted network service via the first antenna having the high radiation performance. In this way, it is able to solve the problem that the radiation performance of the antenna is deteriorated due to the deteriorated antenna environment in the mobile terminal.

In a word, in the embodiments of the present disclosure, through the additional controllable switch between the antenna and the network path, the network paths connected to the antenna in the mobile terminal may be switched and configured flexibly in such a manner that the mobile terminal acquires the currently-adopted network service via the first antenna having the high radiation performance. As a result, it is able to prevent the mobile terminal from acquiring the currently-adopted network service via the second antenna having the low radiation performance, thereby to improve the user experience.

For ease of understanding for a person skilled in the art, the present disclosure will be described hereinafter in conjunction with examples.

Figure 2A:
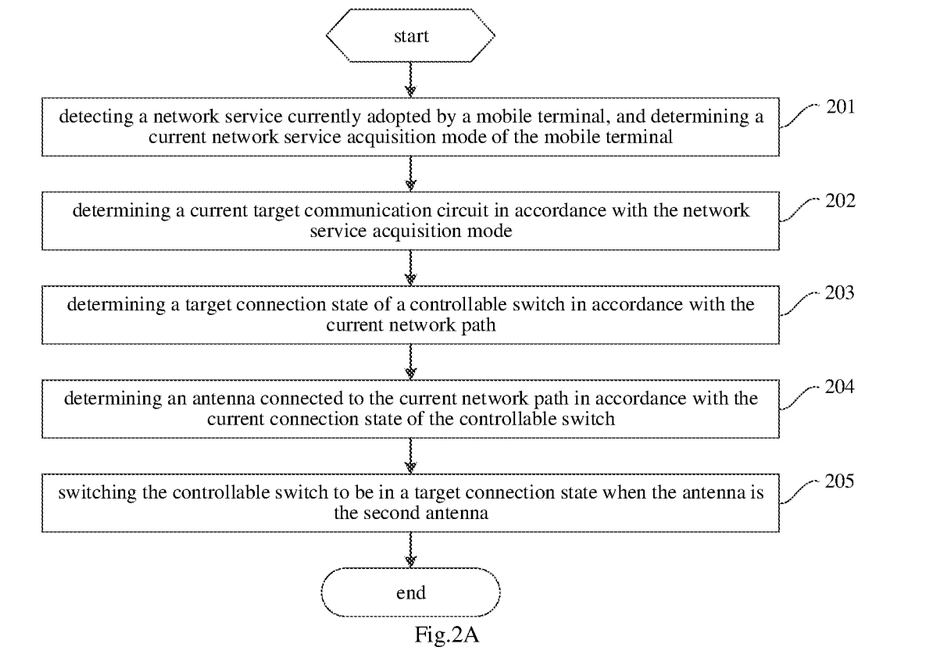
FIG. 2A is a flow chart of another antenna connection method according to an embodiment of the present disclosure.

The present disclosure further provides in some embodiments another antenna connection method which, as shown in FIG. 2A, includes the following steps.

Step 201: detecting a network service currently adopted by a mobile terminal, and determining a current network service acquisition mode of the mobile terminal.

Figure 2B:
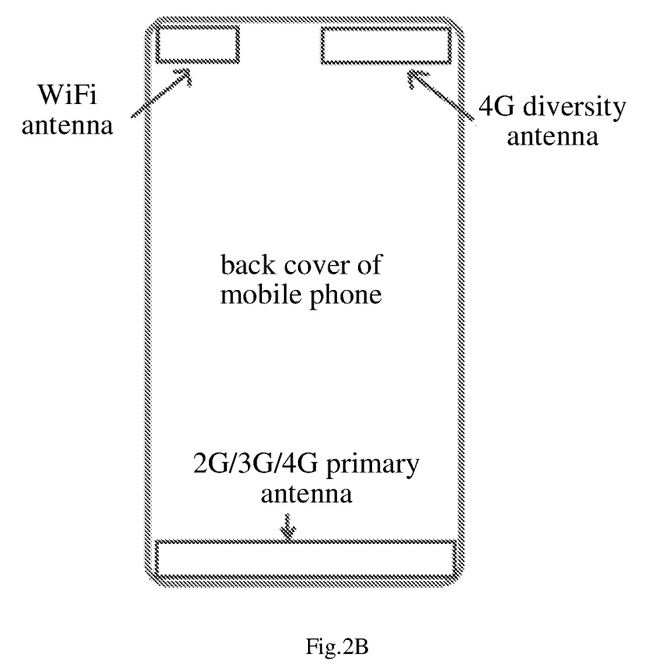
FIG. 2B is a schematic view showing the mobile terminal equipped with three types of antennae according to an embodiment of the present disclosure.

In a possible embodiment of the present disclosure, the mobile terminal may be equipped with one or more types of antennae, e.g., a WiFi antenna, a 2G/3G/4G primary antenna and a 4G diversity antenna as shown in FIG. 2B. A 2.4G WiFi band is very close to bands such as a band 40 in the 4G system, so the 4G diversity antenna may be used as the 2.4G WiFi antenna based on the radiation performance. In the embodiments of the present disclosure, when the radiation performance of the WiFi antenna of the mobile terminal is relatively poor and the performance of the 4G diversity antenna is obviously advantageous over that of the WiFi antenna, the 4G diversity antenna may be selected as the first antenna, and the WiFi antenna may be selected as the second antenna. Through switching the configuration flexibly, the 4G diversity antenna may be used for a WiFi function, so as to acquire better WiFi radiation performance.

During the implementation, in the mobile terminal, an additional DPDT controlled Radio Frequency (RF) switch may be arranged between the antenna and the network path, so as to control one of the 2.4G WiFi path and the 4G diversity path to be switched to be connected to the antenna via the DPDT switch. When the DPDT switch is in a first connection state, as shown in FIG. 1C, the 2.4G WiFi path may be electrically connected to the WiFi antenna, and the 4G diversity path may be electrically connected to the 4G diversity antenna. When the DPDT switch is in a second connection state, as shown in FIG. 1D, the 2.4G WiFi path may be electrically connected to the 4G diversity antenna, and the 4G diversity path may be electrically connected to the WiFi antenna.

It should be appreciated that, the DPDT switch may be controlled through a control port of General-Purpose Input/Output (GPIO). For example, the GPIO may be in high-level state or a low-level state, e.g., it may have a control logic value of 1 or 0. The GPIO of the DPDT switch may be connected to a Central Processing Unit (CPU) of the mobile terminal, and the state of the GPIO may be controlled by the CPU. To be specific, when the logic value of the GPIO is 1, the GPIO may be in the high-level state, and when the logic value of the GPIO is 0, the GPIO may be in the low-level state.

In a possible embodiment of the present disclosure, the mobile terminal may further include a processor configured to control a connection state of the controllable switch in accordance with the network service currently adopted by the mobile terminal. The connection state may include a first connection state and a second connection state. When the network service is a mobile communication network service, the CPU may control the controllable switch to be in the first connection state, and when the network service is a wireless local area network service, the CPU may control the controllable switch to be in the second connection state.

In a possible embodiment of the present disclosure, after the mobile terminal has been started, the CPU of the mobile terminal may monitor and determine in real time whether the network service currently adopted by the mobile terminal is acquired in a WiFi or a 4G mode, i.e., determine the current network service acquisition mode of the mobile terminal. When the network service is acquired in the WiFi mode, the current network service acquisition mode of the mobile terminal may be the WiFi mode, and when the network service is acquired in the 4G mode, the current network service acquisition mode of the mobile terminal may be the 4G mode.

Step 202: determining a current network path in accordance with the network service acquisition mode.

In a possible embodiment of the present disclosure, the network service capable of being adopted by the mobile terminal may include at least one of a mobile communication network service and a wireless local area network service. The controllable switch of the mobile terminal may be a DPDT switch, and the connection state of the controllable switch may include the first connection state and the second connection state. When the controllable switch is in the first connection state, the first antenna may be electrically connected to the first network path, and the second antenna may be electrically connected to the second network path. When the controllable switch is in the second connection state, the first antenna may be electrically connected to the second network path, and the second antenna may be electrically connected to the first network path.

To be specific, when the network service acquisition mode is a wireless local area network acquisition mode, the second network path may be determined as the current network path and configured to acquire the wireless local area network service. When the network service acquisition mode is a mobile communication network acquisition mode, the first network path may be determined as the current network path and configured to acquire the mobile communication network service.

In a possible embodiment of the present disclosure, the first network path may be a mobile communication network diversity path and configured to acquire the mobile communication network service. The second network path may be a wireless local area network path and configured to acquire the wireless local area network service. To be specific, when the network service currently adopted by the mobile terminal is the wireless local area network service, the wireless local area network acquisition mode corresponding to the wireless local area network service may be determined as the current network service acquisition mode of the mobile terminal, and then the wireless local area network path may be determined as the current network path. For example, when the current network service acquisition mode of the mobile terminal is the WiFi mode, the corresponding 2.4G WiFi path may be determined as the current network path. When the network service currently adopted by the mobile terminal is the mobile communication network service, the mobile communication network acquisition mode corresponding to the mobile communication network service may be determined as the current network service acquisition mode of the mobile terminal, and then the mobile communication network diversity path may be determined as the current network path. For example, when the current network service acquisition mode of the mobile terminal is the 4G mode, the corresponding 4G diversity path may be determined as the current network path.

Step 203: determining a target connection state of the controllable switch in accordance with the current network path.

For example, as mentioned above, when the current network path is the wireless local area network path, the predetermined second connection state corresponding to the wireless local area network path may be determined as the target connection state. When the current network path is the mobile communication network diversity path, the predetermined first connection state corresponding to the mobile communication network diversity path may be determined as the target connection state.

During the implementation, the connection state of the DPDT switch and the network path corresponding to each connection state may be preconfigured. For example, when the DPDT switch is in the first connection state, the control logic value of the GPIO may be 1 and the corresponding network path may be the 4G diversity path. When the DPDT switch is in the second connection state, the control logic value of the GPIO may be 0, and the corresponding network path may be the 2.4G WiFi path. To be specific, when the current network path is the 4G diversity path, the first connection state may be determined as the target connection state, to enable the 4G diversity path to be electrically connected to the first antenna having relatively high radiation performance in the mobile terminal. When the current network path is the 2.4G WiFi path, the second connection state may be determined as the target connection state, and the 2.4G WiFi path may be electrically connected to the first antenna having relatively high radiation performance in the mobile terminal.

Step 204: determining the antenna connected to the current network path in accordance with the current connection state of the controllable switch.

In the embodiments of the present disclosure, the mobile terminal may determine the antenna connected to the current network path in accordance with the current connection state of the controllable switch, and thereby determine whether it is necessary to switch the antenna connected to the current network path. To be specific, when the antenna currently connected to the current network path is the first antenna having the relatively high radiation performance, the mobile terminal may determine that it is unnecessary to switch the antenna connected to the current network path, i.e., it is unnecessary to switch the connection state of the controllable switch. When the antenna connected to the current network path is the second antenna having the relatively low radiation performance, Step 205 may be performed, i.e., it is necessary to switch the connection state of the controllable switch, so as to enable the current network path to acquire the network service, e.g., receive and/or transmit network data through the first antenna having the relatively high radiation performance.

Step 205: switching the controllable switch to be in the target connection state when the antenna is the second antenna.

In a possible embodiment of the present disclosure, after the mobile terminal has been started, the GPIO of the DPDT switch may be set as a default state value, e.g., it may be initialized to be the control logic value 1, so as to control the DPDT switch to be in the first connection state in which the 2.4G WiFi path is electrically connected to the WiFi antenna and the 4G diversity path is electrically connected to the 4G diversity antenna. The CPU of the mobile terminal may monitor and determine in real time whether the network service currently adopted by the mobile terminal is acquired in the WiFi mode or the 4G mode. When the network service is acquired in the WiFi mode, the CPU of the mobile terminal may control the logic value of the GPIO to be changed from 1 to 0, so as to switch the DPDT switch from the first connection state to the second connection state, and enable the 2.4G WiFi path to be electrically connected to the 4G diversity antenna, i.e., enable the 4G diversity antenna to achieve a WiFi function of the mobile terminal, thereby to acquire better WiFi radiation performance. When the network service is acquired in the 4G mode, the CPU of the mobile terminal may control the logic value of the GPIO to be changed from 0 to 1, so as to switch the DPDT switch from the second connection state to the first connection state, and enable the 4G diversity path to be electrically connected to the 4G diversity antenna, thereby to acquire the 4G network service through the 4G diversity antenna having the relatively high radiation performance.

In a word, in the embodiments of the present disclosure, the additional DPDT switch may be arranged between the WiFi antenna and the 4G diversity antenna. When the data service is acquired by the mobile terminal in the WiFi mode rather than the 4G mode, the DPDT switch may be controlled through software in the mobile terminal, so as to switch the 2.4G WiFi path corresponding to the WiFi mode, which was originally connected to the WiFi antenna, to be electrically connected to the 4G diversity antenna with better performance, thereby to improve the WiFi radiation performance of the mobile terminal as well as improve the user experience about the Wifi service. In addition, the 4G network service is currently not being adopted, so the user experience may not be adversely affected when the 4G diversity path is connected to the WiFi antenna having the relatively low radiation performance. When the mobile terminal needs to adopt the 4G network service, the DPDT switch may be controlled through the software in the mobile terminal, so as to switch the 2.4G WiFi path corresponding to the WiFi mode to be electrically connected to the original WiFi antenna and switch the 4G diversity path to be electrically connected to the 4G diversity antenna, thereby to provide the mobile terminal with better 4G performance immediately as well as meet the user's requirement.

In the embodiments of the present disclosure, without any additional device, the mobile terminal may make logical judgment on an application scenario, and then enable the network path corresponding to the currently-adopted network service to be switched to be electrically connected to the first antenna having the relatively high radiation performance through the DPDT switch. For example, when the WiFi network service is adopted, the 2.4G WiFi path may be switched to be connected to the 4G diversity antenna having the relatively high radiation performance. In this way, it is able to remarkably improve the entire WiFi performance of the mobile terminal, i.e., to prevent the occurrence of a situation where the radiation performance of the WiFi antenna is worse than the that of the 4G diversity antenna when an environment of the WiFi antenna is worse than an environment of the 4G diversity antenna, thereby to improve the user experience.

It should be appreciated that, for ease of description, the above-mentioned method has been described on the basis of a series of steps, and a person skilled in the art understands that, the present disclosure is not limited thereto, and these steps may also be performed in any other order or simultaneously. In addition, a person skilled in the art also understands that, the embodiments are for illustrative purposes only, and the steps involved therein may not be always necessary.

Figure 3:
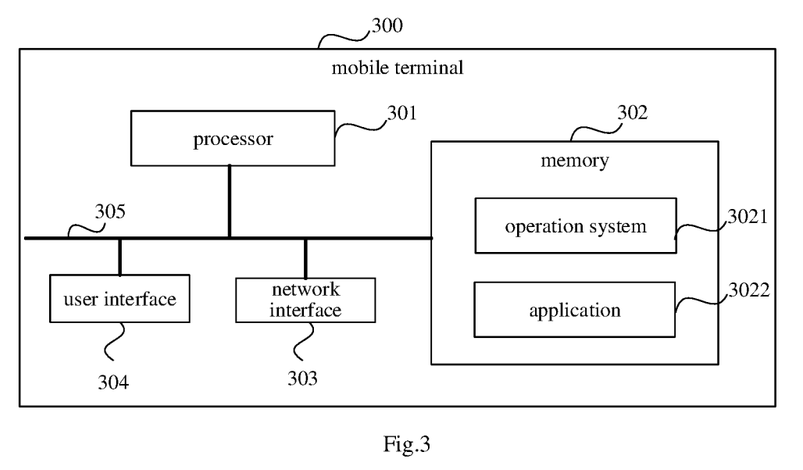
FIG. 3 is a block diagram of another mobile terminal according to an embodiment of the present disclosure.

The present disclosure further provides in some embodiments another mobile terminal 300 which, as shown in FIG. 3, includes at least one processor 301, a memory 302, at least one network interface 303 and a user interface 304. The components of the mobile terminal 300 may be coupled together through a bus system 305. It should be appreciated that, the bus system 305 is configured to achieve connection and communication among the components. Apart from a data bus, the bus system 305 may further include a power source bus, a control bus and a state signal bus. For clarification, all these buses in FIG. 3 may be collectively called as bus system 305.

The user interface 304 may include a display, a keyboard or a pointing device (e.g., mouse, trackball, touchpad or touch panel).

It should be appreciated that, the memory 302 may be a volatile memory, a nonvolatile memory or both. The nonvolatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but non-restrictively, the RAM may include one of various memories, such as Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 302 intends to include, but not limited to, the above-mentioned and any other appropriate memories. The memory 302 may store pre-configured data in advance, including data in a precondition, such as pre-configured logical state value of the controllable switch. The contents stored in the memory are not be particularly defined herein.

In some embodiments of the present disclosure, the following elements may be stored in the memory 302: an executable module or data structure, a subset or an extended set thereof, an operating system 3021 and an application 3022.

The operating system 3021 may include various system programs, e.g., a framework layer, a core library layer and a driving layer, so as to implement various basic services and process hardware-based tasks. The application 3022 may include various applications, e.g., Media Player and Browser, so as to implement various application services. The programs for implementing the above-mentioned method may be included in the application 3022.

In the embodiments of the present disclosure, through calling a program or instruction stored in the memory 302, e.g., a program or instruction stored in the application 3022, the processor 301 is configured to: detect a network service currently adopted by the mobile terminal, and determine a current network path, the network path including a first network path and a second network path; determine a target connection state of a controllable switch in accordance with the current network path; and switch the controllable switch to be in the target connection state, so as to enable the current network path to be electrically connected to a first antenna via the controllable switch. When the controllable switch is switched to the target connection state, the current network path may be connected to the first antenna of the mobile terminal through the controllable switch.

The processor 301 configured to determine the target connection state of the controllable switch in accordance with the current network path is further configured to: when the current network path is the first network path, select a predetermined first connection state corresponding to the first network path as the target connection state; and when the current network path is the second network path, select a predetermined second connection state corresponding to the second network path as the target connection state.

The above-mentioned method may be applied to, or implemented by, the processor 301. The processor 301 may be an integrated circuit (IC) chip having a signal processing capability. During the implementation, the steps of the above-mentioned method may be completed through an integrated logic circuit of hardware in the processor 301 or instructions in the form of software. The processor 301 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the decoding processor in the form of hardware, or a combination of hardware and software modules in the decoding processor. The software module may be located in a known storage medium such as an RAM, a flash memory, an ROM, a PROM, an EEPROM, or a register. The storage medium may be located in the memory 302, and the processor 301 may read information stored in the memory 302 so as to implement the steps of the method in conjunction with the hardware.

It should be appreciated that, the embodiments of the present disclosure may be implemented by hardware, software, firmware, middleware, microcode or a combination thereof. For the hardware implementation, the processing unit may be implemented in one or more of an ASIC, a DSP, a DSP device (DSPD), a Programmable Logic Device (PLD), an FPGA, a general-purpose processor, a controller, a microcontroller, a microprocessor, another electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, the network service may include at least one of a mobile communication network service and a wireless local area network service. The processor 301 configured to detect the network service currently adopted by the mobile terminal and determine the current network path is further configured to: detect the network service currently adopted by the mobile terminal, so as to determine a current network service acquisition mode of the mobile terminal; and when the network service acquisition mode is a wireless local area network acquisition mode, determine the second network path as the current network path configured to acquire the wireless local area network service, or when the network service acquisition mode is a mobile communication network acquisition mode, determining the first network path as the current network path configured to acquire the mobile communication network service.

In a possible embodiment of the present disclosure, prior to switching the controllable switch to be in the target connection state, the processor 301 is further configured to: determine the antenna connected to the current network path in accordance with the current connection state of the controllable switch; and when the antenna is the second antenna, switch the controllable switch to be in the target connection state. To be specific, when the network service is the mobile communication network service, the processor is further configured to control, i.e., switch, the controllable switch to be in the first connection state, so as to enable the first network path to be connected to the first antenna through the controllable switch; and when the network service is the wireless local area network service, the processor is further configured to control, i.e., switch, the controllable switch to be in the second connection state, so as to enable the second network path to be connected to the first antenna through the controllable switch.

In a possible embodiment of the present disclosure, the controllable switch may be a DPDT switch, and the connection state may include the first connection state and the second connection state. When the controllable switch is in the first connection state, the first antenna may be electrically connected to the first network path, and the second antenna may be electrically connected to the second network path. When the controllable switch is in the second connection state, the second antenna may be electrically connected to the first network path, and the first antenna may be electrically connected to the second network path.

The mobile terminal 300 is capable of implementing the procedures implemented by the mobile terminal as mentioned hereinabove, and thus will not be particularly defined herein. According to the embodiments of the present disclosure, through the additional controllable switch, the network paths connected to the antenna in the mobile terminal may be switched and configured flexibly in such a manner that the mobile terminal acquires the currently-adopted network service via the first antenna having the high radiation performance. As a result, it is able to prevent the mobile terminal from acquiring the currently-adopted network service via the second antenna having the low radiation performance, thereby to improve the user experience.

Figure 4:
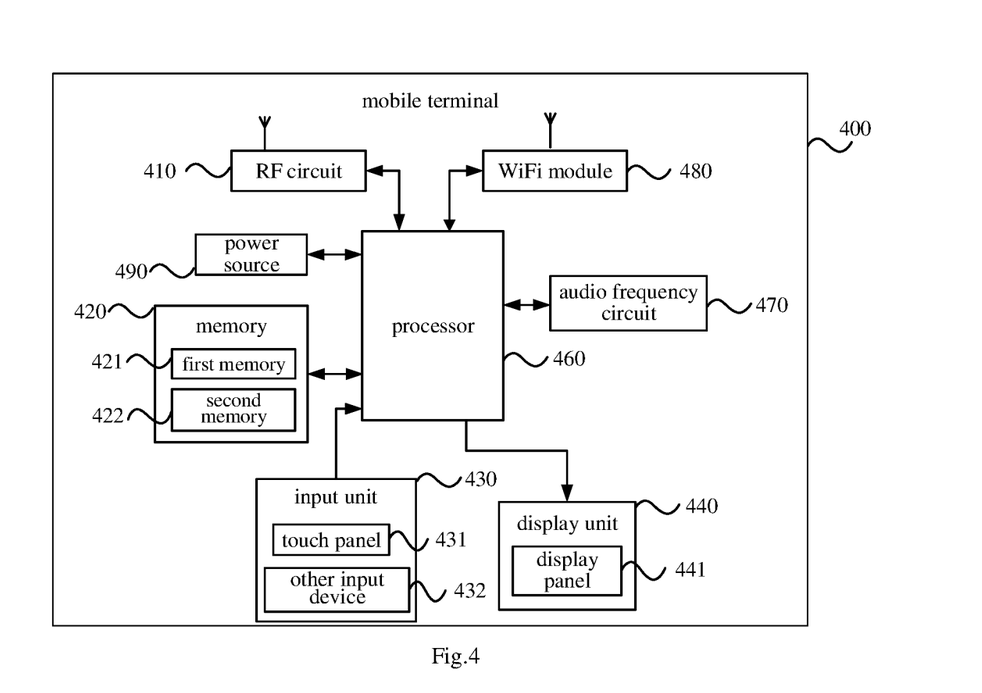
FIG. 4 is a block diagram of yet another mobile terminal according to an embodiment of the present disclosure.

FIG. 4 is a block diagram of yet another mobile terminal according to an embodiment of the present disclosure. In particular, the mobile terminal 400 in FIG. 4 may be a mobile phone, a tablet computer, a Personal Digital Assistant (PDA), an on-board computer, or the like. The mobile terminal may include an antenna, a network path, and a controllable switch connected between the antenna and the network path.

As shown in FIG. 4, the mobile terminal 400 may include a RF circuit 410, a memory 420, an input unit 430, a display unit 440, a processor 460, an audio frequency circuit 470, a WiFi module 480 and a power source 490. In a possible embodiment of the present disclosure, the RF circuit 410 may include the first network path and the first antenna in the above method embodiments, e.g., the above-mentioned 4G diversity path and the 4G diversity antenna. The WiFi module 480 may include the second network path and the second antenna in the above method embodiments, e.g., the above-mentioned 2.4G WiFi path and the WiFi antenna.

The input unit 430 is configured to receive digital or character information inputted by a user, and generate a signal input related to user settings and function control of the mobile terminal 400. To be specific, the input unit 430 may include a touch panel 431. The touch panel 431, also called as touch screen, is configured to collect a touch operation made by the user on or in proximity to the touch panel (e.g., an operation made by the user through any appropriate object or attachment (e.g., a finger of the user or a stylus) on the touch panel 431), and drive the corresponding connection device according to a predetermined program. In an embodiment of the present disclosure, the touch panel 431 may include a touch detection device and a touch controller. The touch detection device is configured to detect a touch position of the user and a signal generated due to the touch operation, and transmit the signal to the touch controller. The touch controller is configured to receive touch information from the touch detection device, convert it into coordinates of a touch point, transmit the coordinates to the processor 460, and receive and execute a command transmitted from the processor 460. In addition, the touch panel 431 may be of a resistive type, a capacitive type, an infrared type or a surface acoustic wave (SAW) type, or the like. Apart from the touch panel 431, the input unit 430 may further include another input device 432 which may include, but not limited to, one or more of a physical keyboard, a functional button (e.g., a volume control button or an on/off button), a trackball, a mouse, and a joystick, which will not be particularly defined herein.

The display unit 440 is configured to display information inputted by the user or information to be presented to the user, and various interfaces for the mobile terminal 400, and the display unit 440 may include a display panel 441. In a possible embodiment of the present disclosure, the display panel 441 may be a Liquid Crystal Display (LCD) panel or an Organic Light-Emitting Diode (OLED) panel.

It should be appreciated that, the touch panel 431 may cover the display panel 441, so as to form a touch display panel. When the touch operation made on or in proximity to the touch display panel has been detected, the touch information may be transmitted to the processor 460 so as to determine a type of a touch event. Then, the processor 460 may provide a corresponding visual output on the touch display panel in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other, such that the two display regions may be distinguished from each other. The application interface display region may be adopted to display interfaces for applications, and each interface may include an icon for at least one application and/or an interface element such as Widget desktop control. The application interface display region may alternatively be a blank interface where no content is contained. The commonly-used controls display region may be adopted to display controls which are used frequently, e.g., setting button, interface number, scroll bar, or such application icons as telephone book icon.

The processor 460 may be a control center of the mobile terminal 400, and connected to each member of the entire mobile phone via various interfaces and lines. The processor 460 is configured to run or execute software programs and/or modules stored in a first memory 421, and call data stored in a second memory 422, so as to achieve various functions of the mobile terminal 400 and process the data, thereby to monitor the mobile terminal 400. In a possible embodiment of the present disclosure, the processor 460 may include one or more processing units.

In the embodiments of the present disclosure, through calling a software program and/or module stored in the first memory 421 and/or the data stored in the second memory 422, the processor 460 is configured to: determine a current network path in accordance with a network service currently adopted by the mobile terminal, the network path including a first network path and a second network path; determine a target connection state of a controllable switch in accordance with the current network path; and switch the controllable switch to be in the target connection state, so as to enable the current network path to be electrically connected to a first antenna via the controllable switch. When the controllable switch is switched to the target connection state, the current network path may be connected to the first antenna of the mobile terminal through the controllable switch.

The processor 301 configured to determine the target connection state of the controllable switch in accordance with the current network path is further configured to: when the current network path is the first network path, select a predetermined first connection state corresponding to the first network path as the target connection state; and when the current network path is the second network path, select a predetermined second connection state corresponding to the second network path as the target connection state.

In a possible embodiment of the present disclosure, the network service may include at least one of a mobile communication network service and a wireless local area network service. The processor 460 configured to determine a current network path in accordance with a network service currently adopted by the mobile terminal is further configured to: detect the network service currently adopted by the mobile terminal, so as to determine a current network service acquisition mode of the mobile terminal; and when the network service acquisition mode is a wireless local area network acquisition mode, determine the second network path as the current network path configured to acquire the wireless local area network service, or when the network service acquisition mode is a mobile communication network acquisition mode, determining the first network path as the current network path configured to acquire the mobile communication network service.

In a possible embodiment of the present disclosure, prior to switching the controllable switch to be in the target connection state, the processor 460 is further configured to: determine the antenna connected to the current network path in accordance with the current connection state of the controllable switch; and when the antenna is the second antenna, switch the controllable switch to be in the target connection state. To be specific, when the network service is the mobile communication network service, the processor is further configured to control, i.e., switch, the controllable switch to be in the first connection state, so as to enable the first network path to be connected to the first antenna through the controllable switch; and when the network service is the wireless local area network service, the processor is further configured to control, i.e., switch, the controllable switch to be in the second connection state, so as to enable the second network path to be electrically connected to the first antenna through the controllable switch.

In a possible embodiment of the present disclosure, the controllable switch may be a DPDT switch, and the connection state may include the first connection state and the second connection state. When the controllable switch is in the first connection state, the first antenna may be electrically connected to the first network path, and the second antenna may be electrically connected to the second network path. When the controllable switch is in the second connection state, the second antenna may be electrically connected to the first network path, and the first antenna may be electrically connected to the second network path.

According to the mobile terminal 400 in the embodiments of the present disclosure, through the additional controllable switch, the network paths connected to the antenna in the mobile terminal may be switched and configured flexibly in such a manner that the mobile terminal acquires the currently-adopted network service via the first antenna having the high radiation performance. As a result, it is able to prevent the mobile terminal from acquiring the currently-adopted network service via the second antenna having the low radiation performance, thereby to improve the user experience.

It should be appreciated that, units and algorithm steps described in the embodiments of the present disclosure may be implemented in the form of electronic hardware, or a combination of a computer program and the electronic hardware. Whether these functions are executed by hardware or software depends on specific applications or design constraints of the technical solution. Different methods may be adopted by a person skilled in the art with respect to the specific applications, so as to achieve the described functions, without departing from the scope of the present disclosure.

It should be further appreciated that, for convenience and clarification, operation procedures of the system, device and units described hereinabove may refer to the corresponding procedures in the method embodiments, and thus will not be particularly defined herein.

It should be further appreciated that, in the embodiments of the present disclosure, the device and method may be implemented in other ways. For example, the embodiments for the apparatus is merely for illustrative purposes, and the units are provided merely on the basis of their logic functions. During the actual application, some units may be provided in other manners; for example, some units or components may be combined together or integrated into another system. Alternatively, some functions may be omitted or not executed. In addition, the coupling connection, direct coupling connection or communication connection discussed herein may be implemented via interfaces, and the indirect coupling connection or communication connection between the devices or units may be implemented in an electrical or mechanical form or in another form.

The units may be, or may not be, physically separated from each other. A component displayed as a unit may be, or may not be, a physical unit, i.e., it may be arranged at one position, or distributed on a plurality of network elements. Parts or all of the unit may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, substantially, or parts of the technical solutions of the present disclosure contributing to the prior art, or parts of the technical solutions of the present disclosure, may appear in the form of software products, which may be stored in a storage medium and include instructions so as to enable computer equipment (a personal computer, a server, a network equipment, or the like) to execute all or parts of the steps of the method according to the embodiments of the present disclosure. The storage medium includes one of various mediums capable of storing therein program codes, e.g., a universal serial bus (USB) flash disk, a mobile hard disk, a ROM, a RAM, a magnetic disk or an optical disk.

The above embodiments are for illustrative purposes only, but the present disclosure is not limited thereto. A person skilled in the art may make further modifications and improvements without departing from the spirit of the present disclosure, and these modifications and improvements shall also fall within the scope of the present disclosure. A protection scope of the present disclosure is defined by attached claims.

What is claimed is:

1. An antenna connection method for a mobile terminal, wherein the mobile terminal comprises a controllable switch, a network path, and an antenna, wherein one end of the controllable switch is connected to the antenna, and the other end of the controllable switch is connected to the network path; the controllable switch is configured to control a connection between the network path and the antenna; the antenna is configured to receive and transmit signals, and comprises a first antenna and a second antenna, wherein a radiation performance of the first antenna is higher than a radiation performance of the second antenna; the network path is configured to provide a network service for the mobile terminal, and comprises a first network path and a second network path; when the controllable switch is in a first connection state, the first network path is electrically connected to the first antenna, and the network service is provided by the first network path; and when the controllable switch is in a second connection state, the second network path is electrically connected to the first antenna, and the network service is provided by the second network path, wherein the antenna connection method comprises:

detecting the network service currently adopted by the mobile terminal, and determining a current network path, wherein the current network path comprises the first network path and the second network path;

determining a target connection state of the controllable switch in accordance with the current network path; and switching the controllable switch to be in the target connection state, to enable the current network path to be electrically connected to the first antenna via the controllable switch, wherein the determining the target connection state of the controllable switch in accordance with the current network path comprises: when the current network path is the first network path, selecting a predetermined first connection state corresponding to the first network path as the target connection state; and when the current network path is the second network path, selecting a predetermined second connection state corresponding to the second network path as the target connection state.

2. The antenna connection method according to claim 1, wherein the network service comprises at least one of a mobile communication network service and a wireless local area network service; and wherein the detecting the network service currently adopted by the mobile terminal and determining the current network path comprises:

detecting the network service currently adopted by the mobile terminal, and determining a current network service acquisition mode of the mobile terminal; and when the network service acquisition mode is a wireless local area network acquisition mode, determining the second network path as the current network path, wherein the second network path is configured for acquiring a wireless local area network service; or when the network service acquisition mode is a mobile communication network acquisition mode, determining the first network path as the current network path, wherein the first network path is configured for acquiring a mobile communication network service.

3. The antenna connection method according to claim 1, wherein prior to switching the controllable switch to be in the target connection state, the antenna connection method further comprises:

determining an antenna connected to the current network path in accordance with the current connection state of the controllable switch; and when the antenna is the second antenna, switching the controllable switch to be in the target connection state.

4. The antenna connection method according to claim 3, wherein:

the controllable switch is a DPDT switch, and the connection state comprises the first connection state and the second connection state;

when the controllable switch is in the first connection state, the first antenna is electrically connected to the first network path, and the second antenna is electrically connected to the second network path; and when the controllable switch is in the second connection state, the second antenna is electrically connected to the first network path, and the first antenna is electrically connected to the second network path.

5. A computer-readable storage medium storing therein a computer program, wherein the computer program is configured to be executed by a processor to implement the antenna connection method according to claim 1.

6. An antenna connection method for a mobile terminal, wherein the mobile terminal comprises a controllable switch, a network path, and an antenna, wherein one end of the controllable switch is connected to the antenna, and the other end of the controllable switch is connected to the network path; the controllable switch is configured to control a connection between the network path and the antenna; the antenna is configured to receive and transmit signals, and comprises a first antenna and a second antenna, wherein a radiation performance of the first antenna is higher than a radiation performance of the second antenna; the network path is configured to provide a network service for the mobile terminal, and comprises a first network path and a second network path; when the controllable switch is in a first connection state, the first network path is electrically connected to the first antenna, and the network service is provided by the first network path; and when the controllable switch is in a second connection state, the second network path is electrically connected to the first antenna, and the network service is provided by the second network path, wherein the controllable switch is a Double Pole Double Throw (DPDT) switch; when the controllable switch is in the first connection state, the second network path is electrically connected to the second antenna; and when the controllable switch is in the second connection state, the first network path is electrically connected to the second antenna, wherein the antenna connection method comprises:

detecting the network service currently adopted by the mobile terminal, and determining a current network path, wherein the current network path comprises the first network path and the second network path;

determining a target connection state of the controllable switch in accordance with the current network path; and switching the controllable switch to be in the target connection state, to enable the current network path to be electrically connected to the first antenna via the controllable switch, wherein the determining the target connection state of the controllable switch in accordance with the current network path comprises: when the current network path is the first network path, selecting a predetermined first connection state corresponding to the first network path as the target connection state; and when the current network path is the second network path, selecting a predetermined second connection state corresponding to the second network path as the target connection state.

7. The antenna connection method according to claim 6, wherein:

the network service comprises at least one of a mobile communication network service and a wireless local area network service; and the detecting the network service currently adopted by the mobile terminal and determining the current network path comprises:

detecting the network service currently adopted by the mobile terminal, and determining a current network service acquisition mode of the mobile terminal; and when the network service acquisition mode is a wireless local area network acquisition mode, determining the second network path as the current network path, wherein the second network path is configured for acquiring a wireless local area network service; or when the network service acquisition mode is a mobile communication network acquisition mode, determining the first network path as the current network path, wherein the first network path is configured for acquiring a mobile communication network service.

8. An antenna connection method for a mobile terminal, wherein the mobile terminal comprises a controllable switch, a network path, and an antenna, wherein one end of the controllable switch is connected to the antenna, and the other end of the controllable switch is connected to the network path; the controllable switch is configured to control a connection between the network path and the antenna; the antenna is configured to receive and transmit signals, and comprises a first antenna and a second antenna, wherein a radiation performance of the first antenna is higher than a radiation performance of the second antenna; the network path is configured to provide a network service for the mobile terminal, and comprises a first network path and a second network path; when the controllable switch is in a first connection state, the first network path is electrically connected to the first antenna, and the network service is provided by the first network path; and when the controllable switch is in a second connection state, the second network path is electrically connected to the first antenna, and the network service is provided by the second network path; the mobile terminal further comprises a processor, wherein the processor is configured to control a connection state of the controllable switch in accordance with the network service currently adopted by the mobile terminal, and the connection state comprises the first connection state and the second connection state, wherein the antenna connection method comprises:

detecting the network service currently adopted by the mobile terminal, and determining a current network path, wherein the current network path comprises the first network path and the second network path;

determining a target connection state of the controllable switch in accordance with the current network path; and switching the controllable switch to be in the target connection state, to enable the current network path to be electrically connected to the first antenna via the controllable switch, wherein the determining the target connection state of the controllable switch in accordance with the current network path comprises: when the current network path is the first network path, selecting a predetermined first connection state corresponding to the first network path as the target connection state; and when the current network path is the second network path, selecting a predetermined second connection state corresponding to the second network path as the target connection state.

* * * * *